Patented May 3, 1927.

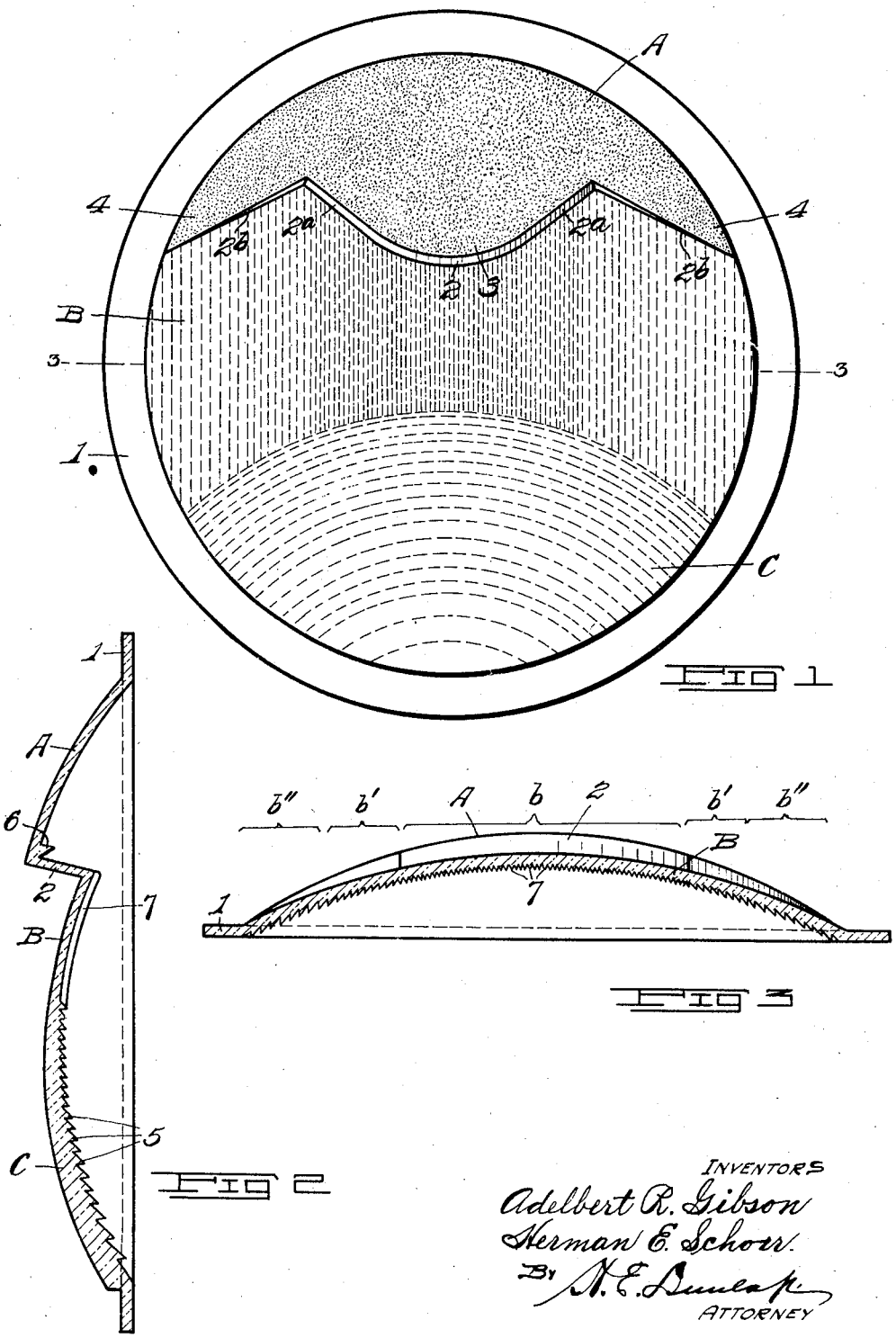

1,627,498

UNITED STATES PATENT OFFICE.

ADELBERT R. GIBSON, OF LOS ANGELES, CALIFORNIA, AND HERMAN E. SCHORR, OF NEW YORK, N. Y.

HEADLIGHT LENS.

Application filed December 7, 1922. Serial No. 605,407.

This invention relates specifically to headlight lenses, and it has for its primary object to provide a lens for the headlights of motor vehicles which possesses certain marked features of advantage over the lenses ordinarily used in that it acts so to distribute and direct the light rays emanating from a lamp associated therewith that for all practical purposes a maximum degree of efficiency in road illumination is obtained.

A further object is to provide a device of the character mentioned which effects the distribution of the light rays in such manner that substantially all thereof are effectively utilized and that, additionally, they are rendered non-glaring and wholly unobtrusive to the eyes of persons facing the headlight.

A still further object is to provide a lens construction which eliminates the objectionable features of prior lenses in which an upper visor-like area of translucent glass is employed for shielding the upper spot or ball of glare presented by the ordinary parabolic reflector; which obviates in large measure the objections to lenses in which vertically disposed prisms are employed, and which similarly overcomes the defects in lenses embodying transverse light deflecting prisms.

With these and other objects in view, all of which will hereinafter be more particularly explained, the invention resides in certain features of construction to be herein described, reference being had to the accompanying drawings, in which—

Figure 1 is a front elevation of our invention;

Figure 2 is a central vertical section of the same; and—

Figure 3 is a horizontal section on line 3—3, Fig. 1.

In the form illustrated, the lens comprises a plurality of areas or zones, each of which is provided with means for directing and distributing the light. In general, the upper area is arranged to obstruct upwardly directed rays to prevent their entering the eye of an approaching driver. The central portion, comprising the largest part of the area of the lens is arranged to distribute the light in such a manner as to illumine distant objects ahead and to the side. This zone will also be preferably arranged to divert a portion of the rays further to the side. The lower zone or area may be adapted to direct the ray downwardly upon the roadway more immediately in front of the car. By thus dividing the illuminating area of the lens into a plurality of zones, it is possible so directively to distribute light as to secure any form of illuminated area desired.

The upper area A is rendered translucent by frosting, sand-blasting, pebbling, or otherwise, preferably by a fused-on coating of colored paint applied to its rear surface, the purpose thereof being to shield from the eyes of persons facing the light the specially obtrusive bright glare created by rays projected forward by the upper part of the usual parabolic form of reflector, or, differently stated, for concealing from view the objectionable ball-like glare spot which invariably occurs upon the upper part of the reflector. Said upper area is of concavo-convex shape, the convexity being forward and the curvature thereof being that of an arc which, if prolonged, would meet the rim 1 at the junction point of said rim with the lowermost portion of the area C. While, for nomenclatorial purposes, said area A is herein termed a visor, or as visor-like, in view of the fact that it possesses the general characteristics of a visor, the lower boundary edge thereof is of a more or less definite irregular, or unconventional, form as distinguished from the arc-shaped lower edges of the so-called visors heretofore employed in lenses. The purpose had in view in providing the visor having the irregular lower outline referred to is to effect practically complete concealment of said ball-like glare spot with a minimum loss of projected rays of light, or without intercepting and effecting the waste of certain light rays which experience has taught may be effectively utilized for road illumination.

The area B which occupies the central part of the lens, extending transversely from the rim at one side to the rim at the other, has its upper portion located rearwardly with respect to the area A, and is joined to the latter by a wall 2 which is disposed at approximately a right angle to the general plane of the lens and forms a reentrant angle with the area A. Said wall 2 has its greatest width in the vertical center line of the lens and gradually inclines or tapers in opposite lateral directions to zero width at the points at which it meets the rim 1. Said wall inclines from its said points of zero width, located approximately 60 degrees from the uppermost point of the lens, in inward and upward directions throughout a suitable distance, or until it meets the downwardly bowed portion 2ª thereof, said portion being preferably parabolic and defining a centrally disposed lip or scallop 3 of curtain-like shield effect. Said scallop portion 3 of the area A depends to such a depth above the center of the lens that it acts to conceal effectually the lower portion of the upper glare spot, while the lateral acute-angled wing portions 4 of said area located between the rim 1 and the lateral inclined portions of the wall 2 serve to conceal relatively small upper lateral glare spots which are ordinarily presented by reflectors. The angular portions of the area B formed between the curved portion 2ª and the inclined lateral portions 2ᵇ of the wall 2 provide for the projection of substantial bundles of light rays which are wholly unobtrusive and which in prior constructions of lenses embodying visors have been wholly lost.

That portion of the lens located below the area A—that is, the portion which embraces the areas B and C in their entirety—is preferably of concavo-convex form. The area C is prismed on its rear face, the prisms 5 thereof being arcuately curved and arranged to deflect upwardly directed light rays so that the same will illuminate the roadway in front of the lamp by which the lens is carried. Said prisms 5 preferably have their faces of incidence progressively increasing in width from the upper to the lower thereof for varying the refractive power and, consequently, for effecting a wider or increased distribution of light. Further, since said prisms are carried by a concave surface, and have bases of substantially uniform dimensions, the said incident faces of the prisms are varied as between themselves, thereby producing a spreading and a more even distribution of light than would be possible by means of prisms having their incident faces uniformly inclined, or having similar inclination.

The middle area B has a rear face thereof vertically prismed, and the central zone $b$ of said area, has the prisms 7 thereof of extremely small, or fine, isosceles triangle form, or, as seen in Fig. 3, of substantially cross-cut saw form. Zones $b'$ located lateral to said zone $b$ have the prisms thereof of increased width, or of coarser form, and have the refracting faces of said prisms located at a different angle for refracting light rays in outwardly inclined lateral directions, or, as seen in Fig. 3, of substantially rip-saw form. The extreme outer lateral zones $b''$ have still coarser prisms of the general character of those of the zone $b'$.

The lens in the embodiment illustrated is of substantially uniform thickness from the top edge thereof to a level at or slightly above the horizontal center thereof, and thence is gradually increased in thickness from said level to the lower extremity of the area C, as shown in Fig. 2. This gradual increase in thickness in a lens area having a curved profile provides for the additional downward bending and the projection of the intercepted rays in an obvious and well-understood manner. This increased thickness brings the center of gravity of the lens below the geometrical center of the lens, thereby additionally providing for maintaining the lens upright.

A bead or shouldered portion 6 may be if desired provided on the rear face of the lens about the lower part of the area A, the same constituting a stop for preventing the paint used on said area from draining downward to the transparent wall 2.

From the foregoing it will be understood that the area A constitutes a screen whereby the uppermost light rays are diffused and whereby the upper portion of the reflector is shielded from view, preventing objectionable glare. The formation of the visor with the depending parabolic lip 3 and the laterally disposed wings 4 provides for effective removal of the glare with a minimum loss of projected light—that is to say, said form of visor provides for elimination of glare in the upper part of the headlight through the employment of a diffusion zone of greatly reduced area.

The provision of the vertical prisms of the middle lens area B is directed to the fullest utilization of the direct rays from the light filament which strike the lens without being reflected, as well as those rays which are reflected by the reflector. Said prisms act to refract these rays horizontally and without downward undue deflection, spreading them more or less evenly upon the roadway at a considerable distance in advance of the headlight and also at the side of the roadway, illuminating ditches, sidewalks and the like. These rays, while sufficing to furnish adequate road illumination, are thus too much scattered to produce any unpleasant glare. The provision of the prisms of said area in zones in which they have different refracting power contributes to the desired result of effectively distributing the rays without glare.

The prisms 5 of the lower lens area C serve to depress upwardly directed rays from the lower part of the reflector to the extent that the same are directed forward substantially horizontally for giving increased illumination at points distant from the headlight. The angles of these depressing prisms may be varied within limits to afford proper redistribution of light. The general concavo-convex curvature of this lower area, augmented by the gradual increase in the lens thickness from top to bottom of said area, serves to increase the downwardly refractive effect of the prisms and not only to produce a further corrective light distribution, but also to provide for utilization of said light to improve the illumination of the roadway.

What is claimed is—

1. A lens comprising a plurality of zones, one of said zones extending from side to side through the central portion of the lens, comprising substantially half of its area, being provided with vertical prisms upon its interior side to distribute the light laterally, and a lower zone comprising a plurality of curved sections having prisms of varying sizes to distribute the light forward upon the roadway.

2. A lens comprising a plurality of zones, one of said zones extending from side to side through the central portion of the lens, comprising substantially half of its area, being provided with vertical prisms upon its interior side to distribute the light laterally, a lower zone comprising a plurality of curved sections having prisms of varying sizes to distribute the light forward upon the roadway, and an upper zone being provided with means for preventing the issuance of direct rays.

In testimony whereof we affix our signatures.

ADELBERT R. GIBSON.
HERMAN E. SCHORR.